United States Patent [19]

Inokuchi

[11] 3,819,857

[45] June 25, 1974

[54] ELECTROMAGNETIC INDUCTION TYPE PATTERN INPUT APPARATUS

[75] Inventor: Seiji Inokuchi, Osaka, Japan

[73] Assignee: Tokyo Shibaura Electric Co., Ltd., Kawasaki-shi, Japan

[22] Filed: Nov. 16, 1972

[21] Appl. No.: 307,235

[30] Foreign Application Priority Data

Nov. 17, 1971 Japan .............................. 46-91507

Dec. 20, 1971 Japan .............................. 46-102672

[52] U.S. Cl. ............................ 178/19, 340/347 AD

[51] Int. Cl. ........................ H04n 1/00, G08c 21/00

[58] Field of Search .......................... 178/19, 18, 20; 340/347 AD; 33/1 M

[56] References Cited

UNITED STATES PATENTS

| | | | |
|---|---|---|---|
| 3,342,935 | 9/1967 | Leifer et al. | 178/19 |
| 3,462,548 | 8/1969 | Rinder | 178/18 |
| 3,466,646 | 9/1969 | Lewin | 340/347 AD |
| 3,598,903 | 8/1971 | Johnson et al. | 178/18 |
| 3,647,963 | 3/1972 | Bailey | 178/19 |
| 3,705,956 | 12/1972 | Dertouzos | 178/18 |

*Primary Examiner*—Thomas A. Robinson

*Attorney, Agent, or Firm*—Flynn & Frishauf

[57] ABSTRACT

An electromagnetic induction type pattern input apparatus comprises an electromagnetic pen including an electromagnetic coil wound upon a magnetic rod; a tablet including a plurality of loop conductors which are arranged, for example on opposite surfaces of an insulator sheet, the conductors on the opposite surfaces of the insulator sheet overlapping with each other and being displaced from each other so that the rectangular coordinate output corresponding to the position of the electromagnetic pen on the insulation sheet can be gray coded; a source of excitation signal for supplying an excitation signal to the electromagnetic pen; and means for detecting the phase of an output induced on the loop conductors according to the magnetic flux produced from the electromagnetic pen, whereby to determine the position of the electromagnetic pen in accordance with the coded output of the loop conductors.

11 Claims, 41 Drawing Figures

ELECTROMAGNETIC INDUCTION TYPE PATTERN INPUT APPARATUS

BACKGROUND OF THE INVENTION

This invention relates to an electromagnetic induction type pattern input apparatus adapted to input positional information or pattern information on a two-dimensional plane into an information processing device, and more particularly to an improved input apparatus using an electromagnetic coupling between an electromagnetic pen and loop conductors arranged on the two-dimensional input plane.

The basic principles of these electromagnetic induction type pattern input apparatus are known. One such known apparatus comprises a plurality of horizontally and vertically arranged parallel conductors, and a plurality of sense amplifiers each connected between one end of the two neighboring conductors, the other end of the conductors being connected together so as to complete an input tablet plane. An electromagnetic pen is placed at a predetermined point on the input tablet plane and position of the point is detected by the outputs obtained from the sense amplifiers. In the apparatus, a pair of conductors connected to a sense amplifier construct a loop conductor and it is possible to determine whether the electromagnetic pen is located or not in the loop of a loop conductor in accordance with the polarity of the electromotive force induced on the loop conductor so that the position of the electromagnetic pen can be detected.

These prior pattern input apparatus have some advantages of the electromagnetic induction type pattern input apparatus in that the electromagnetic pen can be coupled with loop conductors of the tablet plane without contacting thereto, that the apparatus can be simply constructed, that the apparatus will not be influenced by the external noise, and that the apparatus can be operated with high stability and reliability without being influenced by of variation of atmospheric conditions such as temperature.

However, as the abovementioned prior apparatus requires a sense amplifier connected to each of a pair of conductors or a loop conductor, it is not possible to detect the position of electromagnetic pen with high accuracy without increasing the number of sense amplifiers. The conventional apparatus also have disadvantages in that the position detection cannot be achieved between the loops, and that as the position information is obtained from the position where an output is produced at a sense amplifier, it is necessary to further encode the output of the sense amplifier.

SUMMARY OF THE INVENTION

Accordingly, it is an object of this invention to provide an electromagnetic induction type pattern input apparatus capable of reducing the number of sense amplifiers or driving amplifiers without lowering the resolution and capable of obtaining an encoded output therefrom.

It is another object of this invention to provide a tablet of high resolution having simplified loop conductor arrangements and which is easily produced.

An input tablet plane according to the present invention comprises a group of loop conductors having difference patterns and sizes arranged in accordance with a predetermined rule that loop conductors are partly overlapped with one another. The predetermined rule for determining patterns and positions of loop conductors on the tablet is that the desired position on the tablet plane is defined by all gray coded outputs of loops. Each of the outputs corresponds to a binary number of "1" or "0" according to whether or not the electromagnetic pen is located in the loop. The patterns of the loop conductors for satisfying the above-mentioned conditions are generally divided into two groups, the pattern of the first group being comb-shaped and that of the second group being rectangular shaped. The number of teeth of the comb-like pattern is determined according to the desired bit number of the code and resolution of the pattern input apparatus. The width of the loop of the rectangular pattern is also determined according to the bit number and resolution. The patterns of two groups are horizontally and vertically arranged to overlap with each other and to be displaced from each other, each loop of the patterns being connected with a sense amplifier or a driving amplifier. An electromagnetic pen including a coil wound around a magnetic rod is provided, the electromagnetic pen being used for designating the predetermined position on the input tablet plane to electromagnetically couple the pen with the loop conductors on the tablet. According to one aspect of this invention the electromagnetic pen is supplied with a sine wave or rectangular wave signal and the phase of the output signals derived from the sense amplifiers is detected.

According to the present invention, the coded output of the desired position on the tablet plane is obtained by collectively detecting the state of the electromagnetic coupling of the loop conductors with the electromagnetic pen and it is possible to reduce the number of loop conductors exponentially. Further, as the loop conductors are arranged to overlap with each other and to be displaced from each other so as to obtain gray coded outputs, the conductors of the loops can be disposed with a constant distance, thus preventing the conductors from overlapping at the same position. Accordingly, it is not necessary to insulate the conductors from each other and the tablet of this invention can be easily fabricated. Especially, in the case of reducing the distance between conductors for increasing the resolution of the apparatus, the tablet can be easily fabricated by using a printed circuit technique on the insulator sheet.

Further, as a binary number of the gray code usually changes one bit from the preceding or succeeding number, the error provided from the near portion of the electromagnetic pen will be at most ±1 (denoting the distance of conductors as unity), thereby improving the accuracy of the pattern input.

DESCRIPTION OF THE PREFERRED EMBODIMENTS

Figure 1:
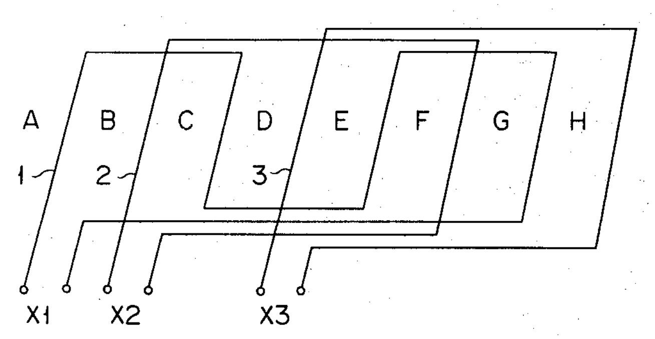
FIG. 1 is a diagrammatic representation of the patterns of loop conductors embodying the principle of this invention.
Figure 2A:
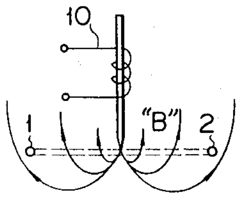
FIGS. 2A and 2B are diagrams to show the relative position of an electromagnetic pen embodying the invention and a loop conductor.
Figure 2B:
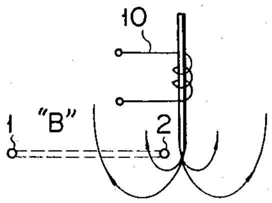

FIG. 1 shows a pattern of three-bit loop conductors arranged in the X-axis direction of a tablet sheet utilized in this invention. An output $x_1$ is produced across output terminals of a first comb shaped loop conductor 1, and outputs $x_2$ and $x_3$ are produced across the output terminals of second and third rectangular loop conductors 2 and 3, respectively. Thus, outputs $x_1$, $x_2$ and $x_3$ are digits constituting three bit digital outputs. An electromagnetic pen to be described later is placed in one of the regions A through H which are defined by the loop conductors 1, 2 and 3 which are displaced from each other as shown. When a driving current is passed through the exciting coil of the electromagnetic pen, the magnetic flux produced by the coil links through loop conductors 1, 2 and 3 to produce outputs $x_1$, $x_2$ and $x_3$. Assuming now that the electromagnetic pen is positioned in the region B, the magnetic flux from the pen links with loop conductors 1 through 3. However, in the region B, as the electromagnetic pen is located within the loop of the loop conductor 1 but outside of the loops of the loop conductors 2 and 3, the linking direction of the magnetic flux is different on the loop 1 and loops 2 and 3. The fact that whether the electromagnetic pen is located within or outside of a loop of a loop conductor can be readily detected by the fact that the directions of the magnetic flux linking the loop conductors 1 through 3 are different dependent upon the relative position between the electromagnetic pen 11 and the loop conductor 1 or 2, as shown in FIGS. 2A and 2B. In the following description, the output of the conductor is expressed by "1" when the pen is located within the loop, and by "0" when the pen is located outside the loop.

The three bit digital outputs produced by respective regions A through H of the multi-loop conductor pattern are the outputs which are gray encoded as shown in the following table.

TABLE

| | | Regions | | | | | | | |
|---|---|---|---|---|---|---|---|---|---|
| | | A | B | C | D | E | F | G | H |
| | $x_1$ | 0 | 1 | 1 | 0 | 0 | 1 | 1 | 0 |
| Output | $x_2$ | 0 | 0 | 1 | 1 | 1 | 1 | 0 | 0 |
| | $x_3$ | 0 | 0 | 0 | 0 | 1 | 1 | 1 | 1 |

Thus, all the regions of the input tablet plane are denoted by a code of three bits $x_1$, $x_2$ and $x_3$. This means that the number of sense amplifiers needed to detect eight regions A to H is only three. Accordingly, by expanding the principles of this invention it is possible to detect $2^n$ regions by using only n sense amplifiers, thus exponentially reducing the number of sense amplifiers as compared with the conventional apparatus.

Further, as clearly shown in the above table, the gray coded output of only one bit among three bits varies between adjacent regions. Denoting the spacing between adjacent regions by unity, the error near the loop conductors will be at most ±1, thereby improving the accuracy of the pattern input. Moreover, the number of the loop conductors that divide adjacent regions on the tablet sheet or the input surface is always one. Thus, there is no chance of overlapping a plurality of loop conductors at the same position whereby preparation of the tablet sheet is greatly simplified.

Figure 3:
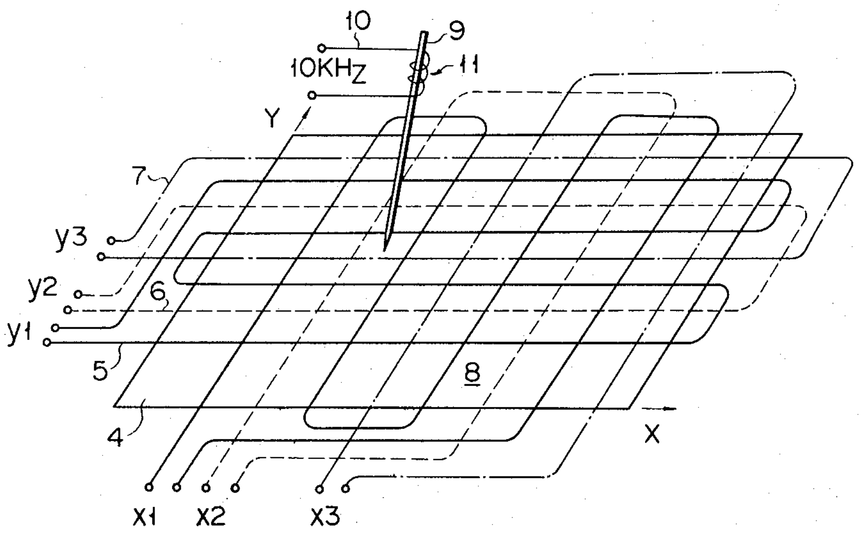
FIG. 3 is a circuit diagram showing a pattern of loop conductors of a tablet sheet embodying the invention.

A pattern as shown in FIG. 3 is actually used wherein the pattern shown in FIG. 1 is arranged along the X and Y-axis directions in order to obtain a rectangular coordinate $(x, y)$ in a two dimensional plane, for example, an X-Y plane. More particularly, multi-loop conductors 1, 2 and 3, similar to those shown in FIG. 1 are arranged along the X-axis on an insulation sheet 4. Loop conductors 5, 6 and 7 having the same pattern as that of loop conductors 1, 2 and 3 are arranged along the Y-axis on the other side of the insulator sheet 4 such that conductors 1, 2 and 3 intersect conductors 5, 6 and 7 at right angles, respectively, thereby completing a tablet sheet 8. Outputs $y_1$, $y_2$ and $y_3$ are produced across output terminals of loop conductors 5, 6 and 7, respectively. An electromagnetic pen 11 comprising an exciting coil 10 wound upon a magnetic rod 9 is used to designate the position of the pen 11 on the tablet sheet 8. A sine wave signal of 10 KHz, for example, is supplied to the exciting coil 10 from a source of exciting signal to be described later.

Figure 4:
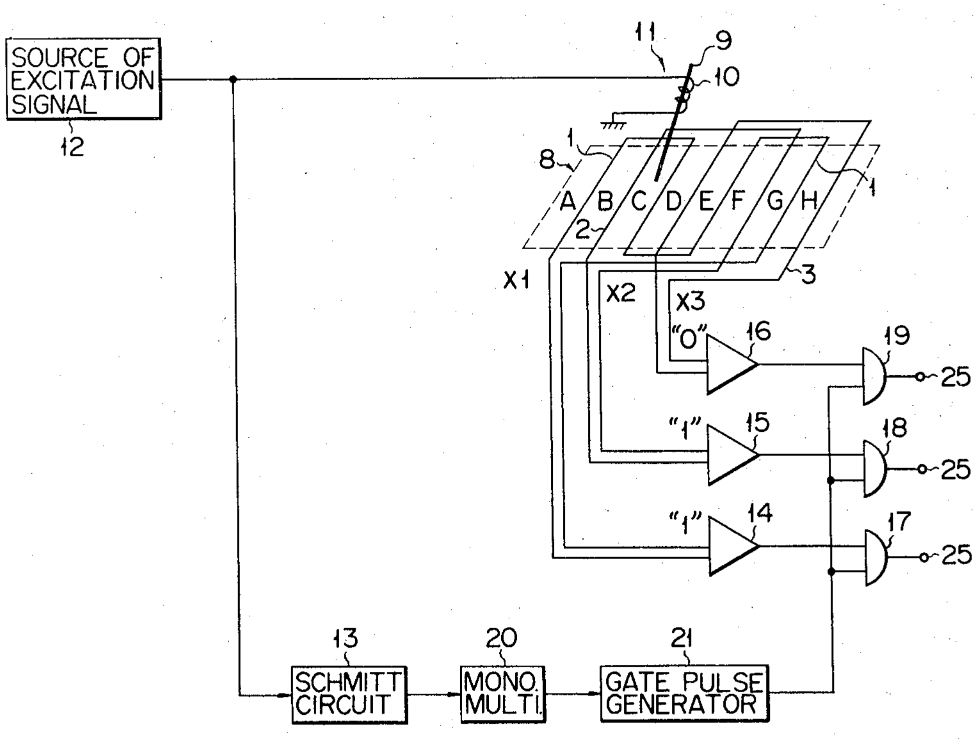
FIG. 4 is a block diagram of one embodiment of this invention.

FIG. 4 shows one embodiment of this invention utilizing a three bit tablet sheet having a pattern as shown in FIG. 3. However, for the sake of description, only the loop conductors 1, 2 and 3 arranged in the X-axis direction are shown in FIG. 4.

Figures 5A, 5B, 5C, 5D, 5E, 5F:
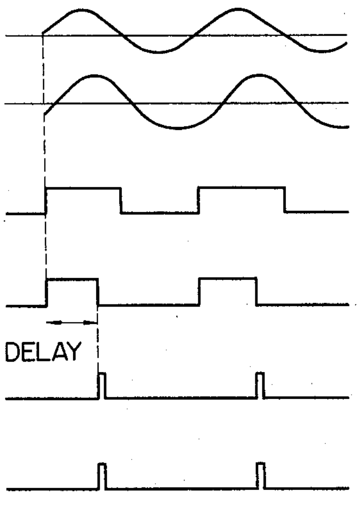
FIGS. 5A through 5F and FIGS. 6A through 6F show signal waveforms useful to explain the operation of the apparatus shown in FIG. 4.
Figures 6A, 6B, 6C, 6D, 6E, 6F:
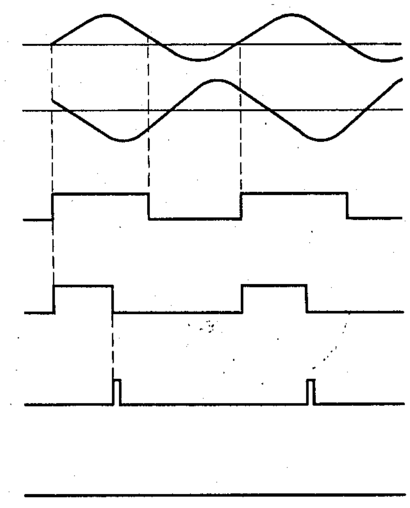

A sine wave exciting signal of 10 KHz supplied from a source of excitation signal 12 and shown by FIGS. 5A and 6A is supplied not only to the exciting coil 10 but also to a Schmitt circuit 13. When the electromagnetic pen 11 is located in region C, as shown, the outputs $x_1$ and $x_2$ are both "1" and the output $x_3$ is "0." As shown by FIG. 5B, the outputs $x_1$ and $x_2$ are in phase with the excitation signal shown by FIG. 5A, whereas the output $x_3$ has the opposite phase from the excitation signal as shown by FIG. 6B. These outputs are applied to one input terminal of AND gate circuits 17, 18 and 19 respectively through sense amplifiers 14, 15 and 16.

The excitation signal applied to the Schmitt circuit 13 is converted into a rectangular waveform as shown in FIGS. 5C and 6C and the rectangular waveform from the Schmitt circuit 13 is applied to a monostable multivibrator 20 to drive it by the leading edge of the rectangular waveform, thereby producing a pulse output having a predetermined width. The pulse output is set such that its trailing edge coincides with the maximum position of the positive excursion of the excitation signal. The output from the monostable multivibrator 20 is applied to a gate pulse generator 21 which generates a gate pulse shown in FIGS. 5E and 6E in response to the trailing edge of the output from the monostable multivibrator 20. The gate pulse is applied to the other inputs of the AND gate circuits 17, 18 and 19. Accordingly, the outputs $x_1$ and $x_2$ are passed through AND gate circuits 17 and 18 to produce a "1" output shown in FIG. 5F. However, as the output $x_3$ is negative, AND gate circuit 19 does not produce any output because this gate circuit 19 is now disenabled. In other words, the AND gate circuit 19 produces a "0" output. The outputs from the AND gate circuits 17, 18 and 19 are supplied to an input device of an electronic computer, for example, through three output terminals 25.

Figures 7, 8, 9, 10:
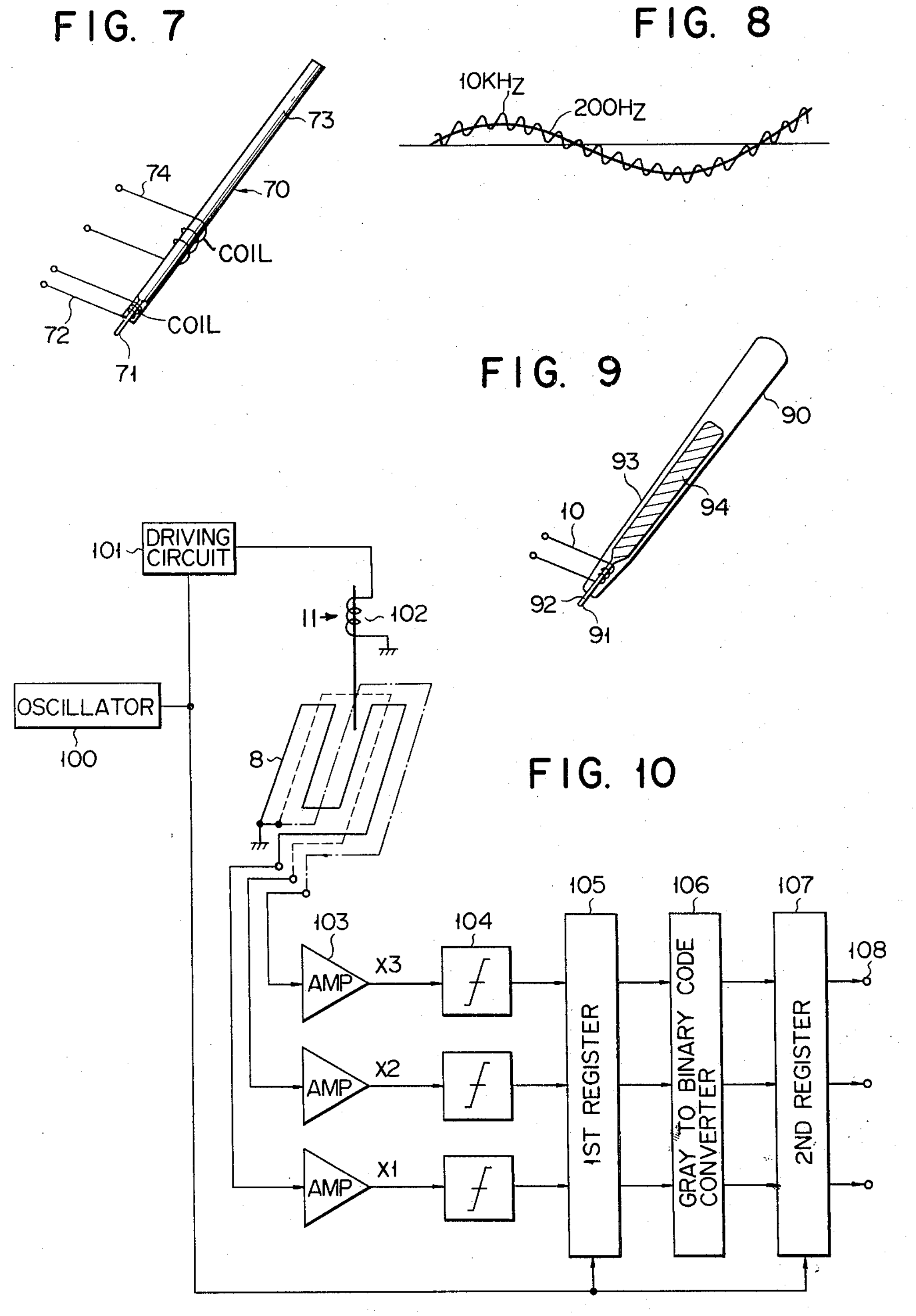
FIG. 7 is a perspective view of a modified example of the electromagnetic pen.
FIG. 8 is a diagram showing the manner of varying the magnetic flux generated by the electromagnetic pen shown in FIG. 7.
FIG. 9 is a diagram showing another example of the electromagnetic pen.
FIG. 10 is a connection diagram of another embodiment of this invention.

In one example of this invention, where the input was produced by a single electromagnetic pen, and when the minimum width of the divided regions of the tablet sheet was set to be 0.5 mm, the permissible maximum width of the loop was up to 256 mm which is determined by the induced voltage whose phase is to be detected and by taking into consideration the S/N ratio. Accordingly, the number of the divided bits is calculated by an equation $256/0.5 = 512 = 2^9$, that is 9 bits. In other words, it is possible to use input information consisting of up to 9 bits.

Where it is necessary to use a larger number of bits, as shown in FIG. 7, a modified electromagnetic pen 70 of dual construction is used which comprises a fine central needle 71 surrounded by a coil 72 which is excited by a high frequency current of 10 KHz and a thick pen holder 73 surrounded by a coil which is excited by a low frequency signal of 200 Hz, for example. With this dual construction, a magnetic flux consists of the 10 KHz signal superposed upon the 200 Hz signal, as shown in FIG. 8. Signals induced by these superposed fluxes are derived out from the loop conductors and are separated into an upper digit bit and a lower digit bit by passing the output signals through filters (not shown) respectively cutting off the high frequency band and the low frequency band. With this arrangement, it is possible to use input information of up to 12 bits.

Where it is desired to simultaneously write the input pattern on the paper, an electromagnetic pen 90 as shown in FIG. 9 is used. More particularly, in this pen 90, a fine opening is perforated through a pen 91 made of magnetic material and ink 94 stored in the pen holder 93 is supplied through this opening to write a pattern on the tablet sheet.

Since the power consumption of the electromagnetic pen is less than 0.05 watt, a battery may be contained in the pen holder for eliminating a connecting wire, thereby facilitating the use of the pen. In this case, as it is necessary to obtain a reference signal for producing a gate pulse, a loop conductor surrounding the entire input range is provided so as to use the signal induced in the loop conductor as the reference signal.

Although in the foregoing embodiment, a sine wave excitation signal was applied to an electromagnetic pen and a sine wave voltage induced in the loop conductors on a tablet sheet and a gate pulse produced by shaping the waveform of a sine wave excitation signal were applied to AND gate circuits, it is also possible to use a rectangular wave signal generator 100 as the source of the excitation signal as shown in FIG. 10. In this case, the output of generator 100 is applied through driving circuit 101 to pen 11 and output pulses having more or less time delay corresponding to the leading and trailing edges of the rectangular wave signal are induced in the loop conductors 1 to 3 on the tablet sheet. Only the output signal corresponding to the leading edges and the rectangular waveform signals are applied to an amplitude comparator 104 through a sense amplifier 103 to accomplish the same object. According to this modification it is possible to eliminate the waveform shaping circuit of the previous embodiment shown in FIG. 4 including the Schmitt circuit 13, monostable multivibrator 20 and gate pulse generator 21.

In the embodiment shown in FIG. 10, the outputs of three bits from three amplitude comparators 104 are temporarily stored in a first register 105 and then applied to a gray to binary code converter 106 as required to convert to a binary code. The binary coded signal from code converter 106 is applied to a second register and then transmitted to an input device of an electronic computer, for example, from output terminals 108.

Figure 11:
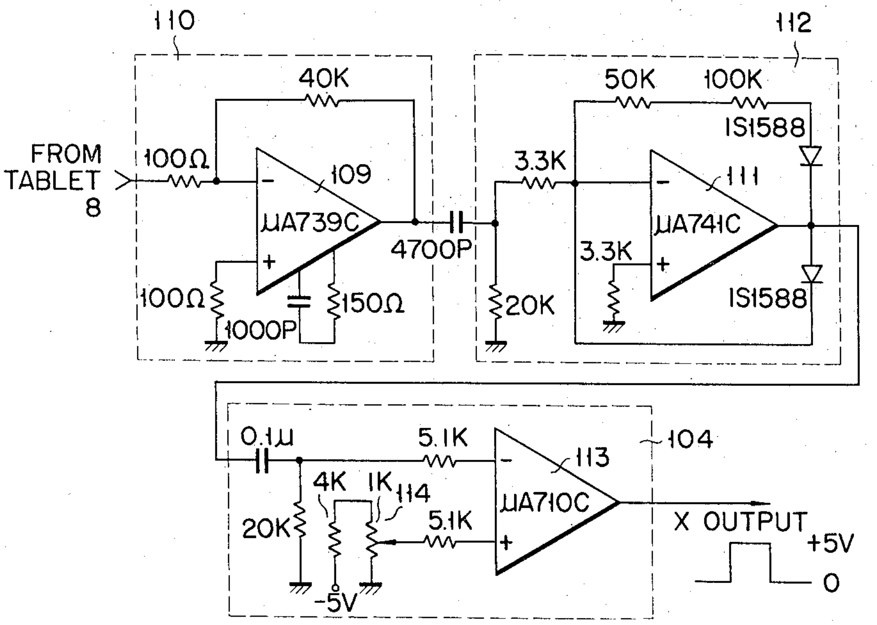
FIG. 11 is a connection diagram of one example of the amplifier and amplitude comparator shown in FIG. 10.

Amplifiers 103 of FIG. 10 comprise a preamplifier 110 including an operational amplifier 109 and a main amplifier 112 including an operational amplifier 111 as shown in FIG. 11. Outputs from tablet 8 are amplified in preamplifier 110 and then applied to main amplifier 112 to adjust its amplitude to be the same value as the other corresponding signals. The output of main amplifier 112 is then applied to an amplitude comparator 104 having an operational amplifier 113. To the positive input terminal of operational amplifier 113 is applied a direct current signal, the voltage level of the signal being adjusted by a variable resistor 114 to obtain an output pulse of zero to +5 volts as an output of amplifier 113. Main amplifier 112 also operates as a linear detector and amplifies only when the input thereto is a positive voltage. On the other hand, a main amplifier for the Y output amplifies only when the input thereto is a negative voltage.

Figure 12:
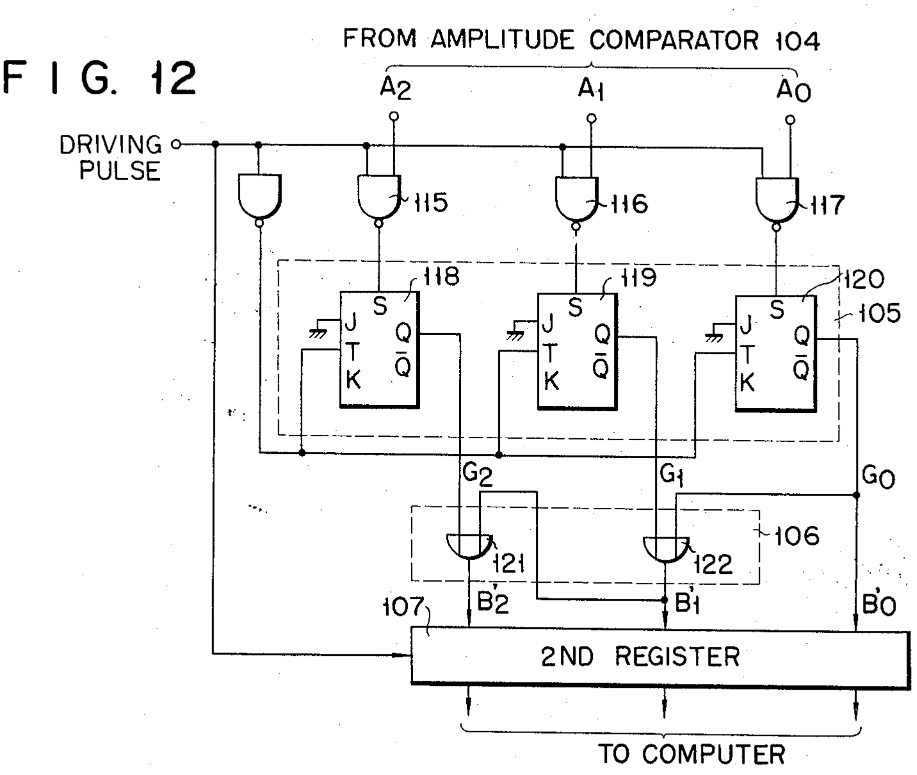
FIG. 12 is a connection diagram of one example of the registers A, B and gray to binary code converter shown in FIG. 10.

Outputs A0, A1 and A2 corresponding to the outputs $x_1$ to $x_3$ from amplitude comparator 104 are applied to an NAND gate 115 of FIG. 12 together with the phase detection pulse or driving pulse from an oscillator 100. FIG. 12 shows a logic circuit for converting the outputs A0 to A2 of amplitude comparator 104 from a gray code to a binary code and this logic circuit corresponds to register 105, code converter 106 and register 107 of FIG. 10.

Figures 13A, 13B, 13C, 13D, 13E, 13F, 13G:
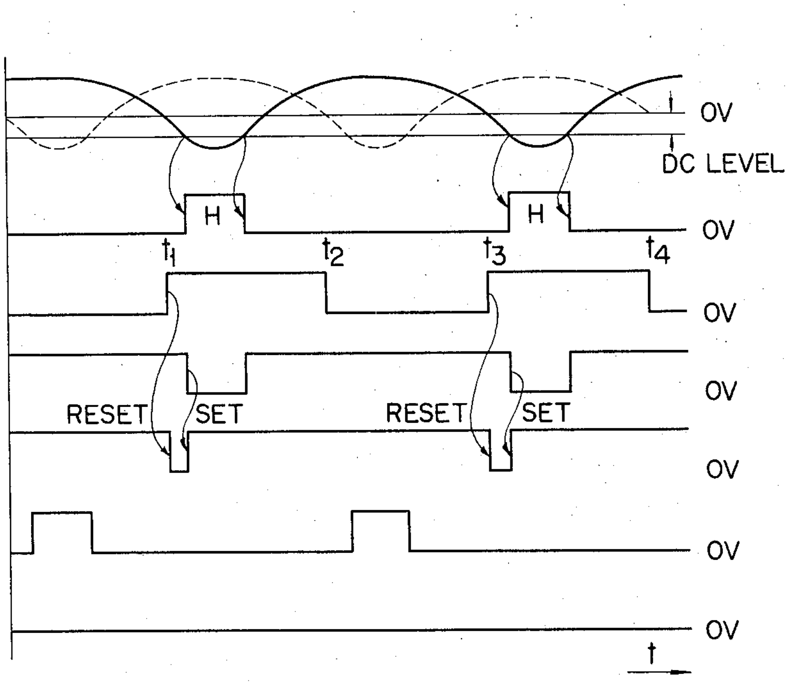
FIGS. 13A–13G comprise a timing chart for explaining the operation of the circuit shown in FIG. 12.

Now, the circuit shown in FIG. 12 will be explained by referring to the timing chart signals shown in FIGS. 13A to 13G. FIG. 13A shows a waveform of an input to the amplitude comparator 104, in which the solid line shows an input waveform in the case that the electromagnetic pen 11 is located within the conductor loop of the tablet 8 and the dotted line is in the case that the pen 11 is located outside of the conductor loop. The input shown with the solid line is firstly compared with the direct current level shown with the dashed line, and an output H as shown in FIG. 13B is produced only when the level of the input is lower than that of the direct current signal to be applied to NAND gates 115 to 117 as shown in FIG. 12. At NAND gates 115 to 117, the phase of the output of amplitude comparator 104 is compared with that of the driving pulse output from oscillator 100. If the output of amplitude comparator 104 is in phase with the driving pulse, the output of opposite polarity shown in FIG. 13D will be obtained. The output is respectively applied from NAND gates 115 to 117 to a flip-flop circuits 118, 119 and 120 to set these flip-flop circuits 118 to 120 with the trailing edge thereof. As flip-flop circuits 118 to 120 are reset with the leading edge of the driving pulse shown in FIG. 13C, the output thereof has a waveform as shown in FIG. 13E.

The input level shown with the dotted line as shown in FIG. 13A is also compared with the direct current level, and an output shown in FIG. 13F is applied to NAND gates 115 to 117 only when the voltage level of the input is lower than that of the direct current signal. The phase of the output shown in 13F is compared with that of the driving pulse. In this case, as the phases of both signals do not coincide with each other, flip-flop circuits 118 to 120 are not set and no output is produced therefrom as shown in FIG. 13G. These flip-flop circuits 118 to 120 comprise the first register 105 shown in FIG. 10.

The Q outputs from flip-flop circuits 118 to 120 are applied through exclusive OR gates 121 and 122 constituting a gray to binary code converter 106 to second register 107 to obtain binary outputs from second register 107.

Further, in the foregoing embodiments, although an excitation signal having a sine waveform or a rectangular waveform was impressed upon an electromagnetic pen for deriving out the signals induced in the loop conductors on a tablet sheet, it is also possible to apply the excitation signal to the loop conductors on the tablet sheet and to derive out the voltage signal induced in the coil of the electromagnetic pen as the pattern input signal.

Figure 14:
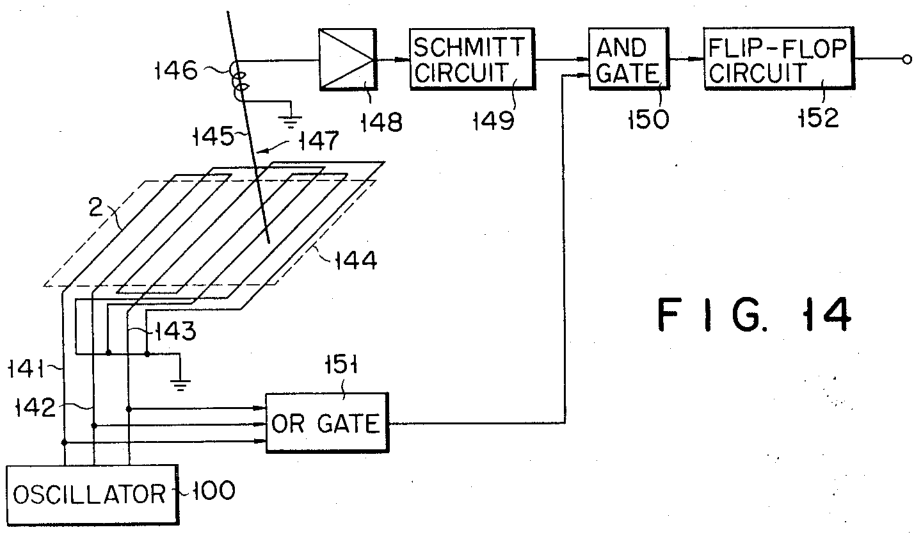
FIG. 14 is a connection diagram of another embodiment of this invention.
Figures 15A, 15B, 15C, 15D, 15E, 15F, 15G, 15H, 15I:
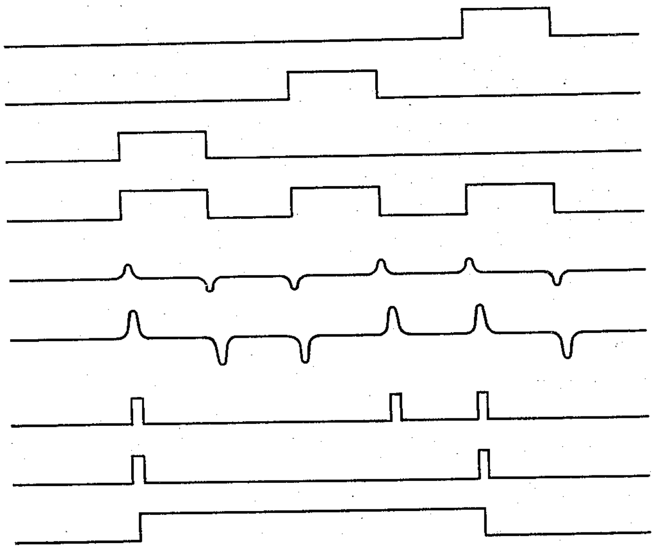
FIGS. 15A through 15I are signal waveforms helpful to explain the operation of the embodiment shown in FIG. 14.

FIG. 14 shows one example of such a modified embodiment wherein the outputs from a rectangular wave signal generator 100 are impressed upon three loop conductors 141, 142 and 143. These rectangular wave signals have relative phases as shown in FIGS. 15A, 15B and 15C, each having a pulse width of 10 microseconds to 1 millisecond and an amplitude of from 0.1 to 1A. An electromagnetic pen 147 including a thin needle shaped magnetic member 145 and an excitation or a sensing coil 146 wound upon the magnetic member 145 is used to cooperate with a tablet sheet 144 having the same construction as that shown in FIG. 4. Then a signal as shown in FIG. 15E will be induced in the sensing coil 146 due to the variation in the magnetic flux corresponding to the position, for example, the G region, of the pen 147. This signal is amplified by an amplifier 148, as shown in FIG. 15F, and is then supplied to a Schmitt circuit 149 which functions to derive out only the positive pulse shown in FIG. 15G. The positive pulse is applied to one input of an AND gate circuit 150. The phase of the output from the Schmitt circuit 149 is delayed with respect to that of the signal induced in the coil 146 due to the time delay in the operation of the amplifier 148.

The output from the rectangular wave generator 100 is also supplied to an OR gate circuit 151 to form a signal as shown in FIG. 15D which is applied to the other input of the AND gate circuit 150. Accordingly, the AND gate circuit 150 produces an output pulse shown in FIG. 15H corresponding to a driving pulse which is applied when the electromagnetic pen 147 is placed in either one of the loops of the loop conductors 141, 142 and 143, but does not produce any output pulse when the pen 147 is positioned outside the loops. The output from the AND gate circuit 150 is applied to a flip-flop circuit 152 for the purpose of converting it into a pure binary code, thereby producing a time signal expressed by a binary signal as shown in FIG. 15I.

Each of the above described embodiments is constructed to produce three bit gray coded outputs, but as above described it is possible to increase the number of bits to about 9. Of course, the number of the loop conductors should be increased as the number of bits is increased.

Figure 16:
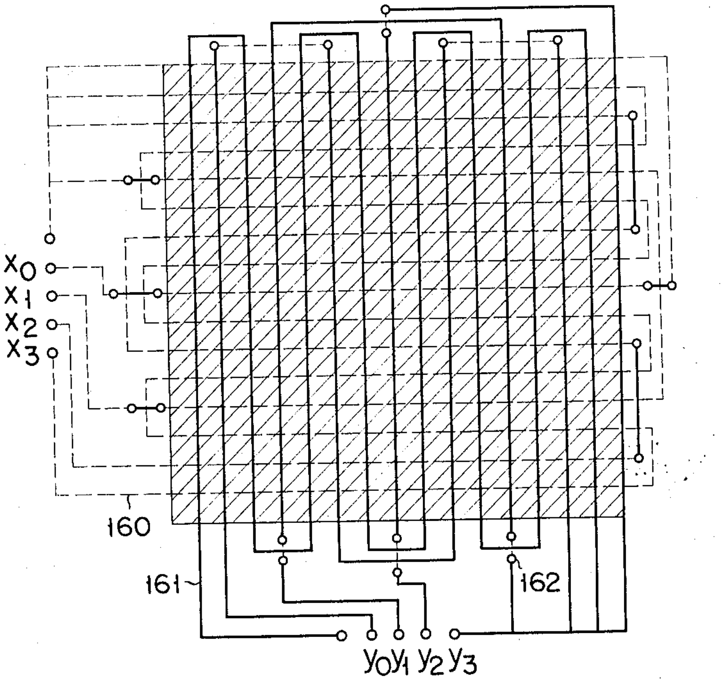
FIG. 16 is a diagram showing another example of the loop conductor pattern.

FIG. 16 shows a pattern of the arrangement of the loop conductors on a tablet sheet for the purpose of obtaining four bit gray coded outputs. Similar to a conventional circuit board this pattern can be formed by forming loop conductors 160 and 161 in the directions of the X and Y-axes on both sides of an insulation sheet by means of a photoetching technique. Solid lines indicate loop conductors formed on the upper surface of the insulation sheet while dotted lines indicate those formed on the lower surface. As shown in FIG. 16, the cubically crossed portions of the loop conductors 160 shown by dotted lines and extending in the X-axis direction with the loop conductors 161 shown by solid lines extending in the Y-axis direction penetrate through the insulation sheet by through holes 162 and are connected on the opposite side thereof. The shaded portion functions as the effective input surface.

Where the tablet sheet is made of a transparent insulation sheet, the input of a complicated pattern is possible because the tablet sheet pattern can be superposed upon the table sheet thereby facilitating the tracing of the pattern with the electromagnetic pen.

What is claimed is:

1. Electromagnetic induction type pattern input apparatus comprising:

- an electromagnetic pen including an electromagnetic coil wound upon a magnetic rod;
- a tablet including a plurality of comb-shaped and rectangular loop conductors which are arranged on an insulator sheet and being overlapped with each other and being displaced from each other so that the rectangular coordinate output corresponding to the position designated by said electromagnetic pen on said insulation sheet can be gray coded;
- a source of excitation signal for supplying a rectangular wave excitation signal to said electromagnetic coil;
- sense amplifiers respectively connected to said loop conductors of said tablet;
- amplitude comparators for comparing the levels of output signals derived from said sense amplifiers with a predetermined voltage level;
- means for varying said predetermined voltage level; and
- output means for detecting the output signals of said amplitude comparators, whereby to detect the position on said loop conductors designated by said electromagnetic pen.

2. The apparatus according to claim 1 wherein said loop conductors are X-axis and Y-axis loop conductors which are respectively arranged on both surfaces of said insulation sheet of said tablet and the crossing portions of said loop conductors forming one surface of said insulation sheet are electrically connected on the other surface thereof via holes formed through said sheet.

3. The apparatus according to claim 1 wherein said insulator sheet of said tablet is a transparent insulating sheet.

4. The apparatus according to claim 1 wherein said electromagnetic pen comprises a pen holder having therein an ink reservoir and a magnetic pen having a passage communicating with said ink reservoir.

5. The apparatus according to claim 1 wherein said electromagnetic pen includes a first coil energized by a high frequency excitation signal and a second coil energized by a low frequency excitation signal.

6. The apparatus according to claim 1 wherein each of said amplitude comparators includes an operational amplifier, the output signal from a sense amplifier being supplied to one of the input terminals of said operational amplifier, and a variable d.c. voltage being supplied to the other of the input terminals of said operational amplifier.

7. The apparatus according to claim 1 wherein said output means includes a plurality of NAND gates supplied with the output signal from said amplitude comparators and with the output from said source of excitation signal; a plurality of flip-flop circuits connected to the output terminals of said NAND gates; a plurality of exclusive OR circuits connected to output terminals of said flip-flop circuits; and a register connected to the output of said exclusive OR circuits.

8. Electromagnetic induction type pattern input apparatus comprising:

an electromagnetic pen including first and second electromagnetic coils wound upon a magnetic rod, said first and second coils being simultaneously energized by high and low frequency excitation signals, respectively;

a tablet including a plurality of comb-shaped and rectangular loop conductors which are arranged on an insulator sheet and being overlapped with each other and being displaced from each other so that the rectangular coordinate output corresponding to the position designated by said electromagnetic pen on said insulation sheet can be gray coded;

a source of excitation signals for supplying said high and low frequency excitation signals to said first and second electromagnetic coils, respectively; and means for detecting the output signals induced on the loop conductors according to the magnetic flux produced from the electromagnetic pen and for separating high and low frequency portions of said output signals, whereby to detect the position on said loop conductors designated by said electromagnetic pen.

9. The apparatus according to claim 8 wherein said loop conductors are X-axis and Y-axis loop conductors which are respectively arranged on both surfaces of said insulation sheet of said tablet and the crossing portions of said loop conductors forming one surface of said insulation sheet are electrically connected on the other surface thereof via through holes formed in said sheet.

10. The apparatus according to claim 8 wherein said insulator sheet of said tablet is a transparent insulating sheet.

11. The apparatus according to claim 8 wherein said electromagnetic pen comprises a pen holder having therein an ink reservoir and a magnetic pen having a passage communicating with said ink reservoir.

* * * * *